(12) United States Patent
Akita

(10) Patent No.: US 7,216,023 B2
(45) Date of Patent: May 8, 2007

(54) LANE KEEPING ASSIST DEVICE FOR VEHICLE

(75) Inventor: Tokihiko Akita, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 146 days.

(21) Appl. No.: 11/165,203

(22) Filed: Jun. 24, 2005

(65) Prior Publication Data
US 2006/0030987 A1   Feb. 9, 2006

(30) Foreign Application Priority Data
Jul. 20, 2004   (JP)   ............... 2004-212044
Jul. 20, 2004   (JP)   ............... 2004-212045

(51) Int. Cl.
*G06F 19/00*   (2006.01)
(52) U.S. Cl. .................. 701/41; 701/70; 701/301; 348/148
(58) Field of Classification Search ........... 701/36, 701/41, 70, 300, 301; 348/148; 340/435, 340/436, 903
See application file for complete search history.

(56) References Cited

U.S. PATENT DOCUMENTS

| | | | |
|---|---|---|---|
| 6,005,492 A * | 12/1999 | Tamura et al. ............... 340/937 |
| 6,185,492 B1 * | 2/2001 | Kagawa et al. ............... 701/41 |
| 6,212,453 B1 * | 4/2001 | Kawagoe et al. ............. 701/41 |
| 6,256,561 B1 * | 7/2001 | Asanuma ..................... 701/41 |
| 6,308,123 B1 * | 10/2001 | Ikegaya et al. ............... 701/41 |
| 6,748,302 B2 * | 6/2004 | Kawazoe ....................... 701/1 |
| 2005/0125153 A1 * | 6/2005 | Matsumoto et al. ........ 701/300 |
| 2005/0265579 A1 * | 12/2005 | Nishida ..................... 382/103 |

FOREIGN PATENT DOCUMENTS

| | | |
|---|---|---|
| JP | 60-037011 | 2/1985 |
| JP | 02-027408 | 1/1990 |
| JP | 02-048704 | 2/1990 |

* cited by examiner

*Primary Examiner*—Gary Chin
(74) *Attorney, Agent, or Firm*—Sughrue Mion, PLLC

(57) ABSTRACT

A lane keeping assist device for a vehicle includes a steering control device, a detection device for lane of travel for assisting travel of the vehicle in a lane of travel in accordance with detection results and steering state and traveling state of the vehicle. Road curvature in a direction the vehicle traveling in is estimated on the basis of a first road curvature calculated on the basis of calculation result of a vehicle state amount calculation device and detection result of a state detection device, and a second road curvature calculated on the basis of positional coordinates by a predetermined distance in the direction the vehicle traveling in detected by a navigation system NAV. Target state amount is set on the basis of the road curvature and the steering state and traveling state of the vehicle.

6 Claims, 9 Drawing Sheets

F I G. 14
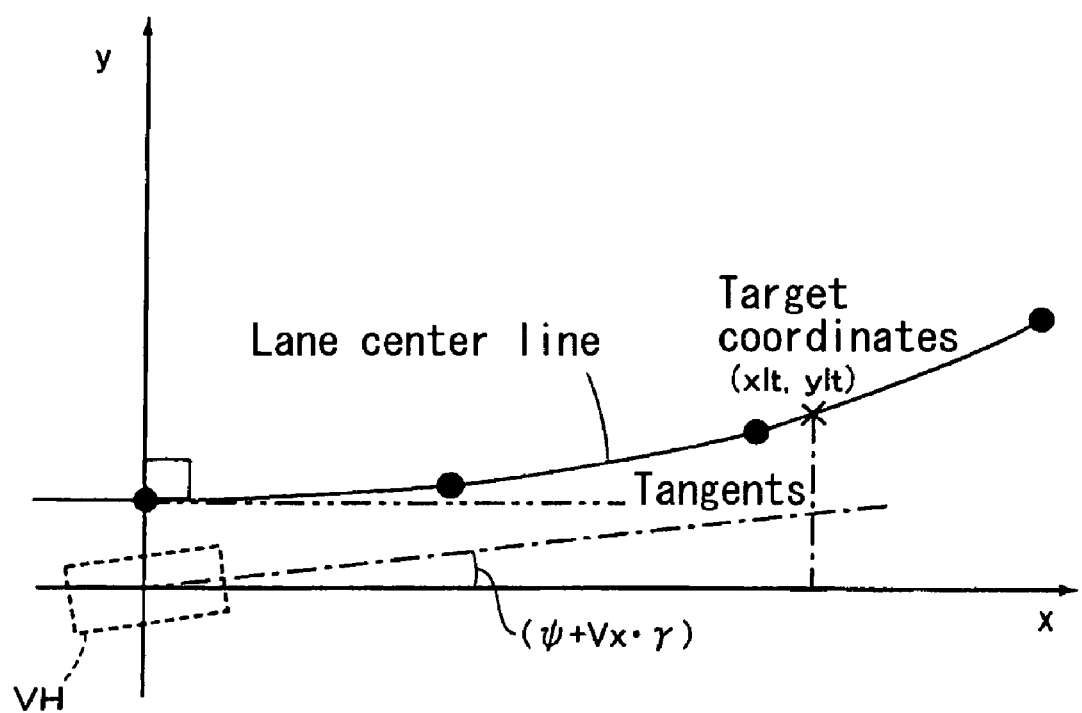

LANE KEEPING ASSIST DEVICE FOR VEHICLE

CROSS REFERENCE TO RELATED APPLICATIONS

This application is based on and claims priority under 35 U.S.C. §119 with respect to Japanese Patent Applications No. 2004-212044 filed on Jul. 20, 2004 and No. 2004-212045 filed on Jul. 20, 2004, the entire content of which are incorporated herein by reference.

FIELD OF THE INVENTION

The present invention relates to a lane keeping assist device for a vehicle. More particularly, the present invention pertains to a lane keeping assist device which includes a steering control means operated in accordance with an operation of a steering wheel by a driver for controlling a steering state in accordance with a state of road surface of travel of a vehicle and a detection means for lane of travel for detecting a lane of travel on the basis of continuous images of a road surface captured by means of an image capturing means in order to assist the vehicle to travel keeping in a lane.

BACKGROUND

Known lane keeping assist devices for a vehicle includes a lane keep assist device including a steering control means operated in accordance with an operation of a steering wheel by a driver for controlling a steering state in accordance with a state of road surface of travel of a vehicle so that the vehicle travels in a lane of travel by controlling the steering state. Further, known lane keeping assist devices for automatically controlling a steering irrespective of an operation by a driver beyond the lane keep assist in order to maintain the vehicle traveling in a lane of travel are disclosed.

For example, JPH2 (1990)-48704A describes an automatic traveling device which sets an optimum target path on a road of travel while searching own path of travel for assisting the vehicle to travel on the target path. In other words, the known automatic traveling device described in JPH2 (1990)-48704A searches a region where the vehicle can travel on its own appropriate target path by recognizing a road edge on the basis of an image of a region in a direction the vehicle traveling in captured by a camera, set appropriate target path within the region where the vehicle can travel, obtains an optimum control target amount in order to merge the vehicle to the target path following a traveling state of the vehicle at that timing, and conduct traveling control of the vehicle in accordance with the control target amount.

JPH2 (1990)-27408A describes a guiding device for vehicle in motion which is constructed to conduct a cornering by calculating a steering amount on the basis of a current direction of the vehicle in motion and an angle of a corner portion using a white line, or the like, provided on a floor for the purpose of showing a limit of a safe path as a guiding line as it is. With the guiding device of the vehicle in motion described in JPH2 (1990)-27408A, a white line drawn on the both sides of a passage in order to indicate a safe path on a floor of plants, or the like, is used as a guiding line, particularly, for the purpose of making cornering operation at narrow space be easy.

JPS60 (1985)-37011 describes an automatic steering device for a vehicle which enables a vehicle to travel without deviating from a forward lane of travel without operation of a steering wheel by a driver. The automatic steering device for a vehicle described in JPS60 (1985)-37011 includes an image capturing means for capturing image of a view of a traveling direction in a bottom right direction of an automobile, a recognizing means for recognizing a line showing a border of a lane of travel from adjacent lane on an image of a road captured by the image capturing means, a distance detection means for detecting distance from a reference position of a line recognized by means of the recognizing means, a steering angle control means for generating a steering angle control signal in accordance with a distance detected by the distance detection means, and a steering angle driving means for changing a direction the vehicle traveling in, in response to a reception of the steering angle control signal from the steering angle control means, for maintaining a distance detected by the distance detection means at a predetermined value by means of an operation of the steering angle control means by the steering angle control signal.

With the constructions described in JPH2 (1990)-48704A, JPH2 (1990)-27408A, and JPS60 (1985)-37011, the traveling on a curve by the vehicle can be conducted along a lane of travel of a vehicle, or the like, which is detected on the basis of images. In this case, it is not always necessary to automatically control the steering irrespective of the operation by a driver, but, for example, cruising operation of the vehicle can be assisted by reducing an operational load of a steering wheel by adding steering torque in order for the vehicle to keep traveling in the center of the lane of travel in response to an operation of the steering wheel by the driver.

With the foregoing known lane keeping assist devices, it is important to detect a lane of travel on a road surface appropriately and safely on the basis of an image captured by a camera. Normally, lane marks for various purposes including lane border lines for recognizing borders between adjacent lanes of travels are drawn on a road surface. Those lane marks include a lane mark with solid line, a lane mark with dotted line, colored lane marks such as in white or in yellow, and colored lane marks with combination of different colors including white and yellow, or the like. The lane marks also include straight lane marks and curved lane marks. It is required to securely detect the lane mark distant from the current position of an own vehicle in order to obtain curvature in order to specify the curved lane mark. Thus, a forward camera which can detect the lane mark distant from the current position of the own vehicle with high precision is required as an image capturing means provided on the lane keeping assist device. Further, although a traveling assist is canceled in case the curvature in the direction the vehicle is traveling in is equal to or greater than a predetermined curvature, a particular measurement is not shown in the known devices despite a cancellation of the traveling assist has to be avoided during a time that the vehicle travels on a road (i.e., curve) having a curved lane mark.

Some vehicles which are recently developed include a forward camera and a rearward camera for watching a view in a forward direction or a view in a backward direction and for parking assist. However, because those known forward camera and rearward camera are only capable for securing images in the vicinity of the vehicle and because the distant images assumes blurred, curvature in the direction the vehicle is traveling in can not be obtained accurately relative to curved lane marks. Thus, the curvature had to be obtained from a traveling locus in the past to be applied, and because a camera which has already been boarded on the vehicle is not converted to detect lane marks and another forward camera with high performance is applied, manufacturing cost of the device is increased.

On the other hand, the device described in JPH2 (1990)-48704A includes a navigation system. Making remarkable progress, recent navigation systems enable to specify current position of a vehicle with high precision using a GPS (i.e., global positioning system) and an inertial navigation. Thus, the information of road configuration in a direction the vehicle traveling in can be detected by the navigation system, and positional coordinates at a predetermined position in the direction the vehicle traveling in can be detected as the information of the road configuration. However, provided that the positional coordinates of the traveling direction of the vehicle is specified using only the detected information from the navigation system, a navigation system with high precision is required because the detection of the positional coordinates is heavily depending on the precision of the navigation system, which increases the manufacturing cost. In addition, in case the forward camera with high precision is required, the manufacturing cost assumes extremely high.

A need thus exists for an inexpensive lane keeping assist device which includes a steering control means for controlling a steering state, a detection means for lane of travel for detecting vehicle's lane of travel on the basis of a captured image for assisting the vehicle to travel within the lane of travel, calculating curvature of a road in the direction the vehicle traveling in on the basis of detected information of a navigation system, calculating curvature of the road along a moving locus of the vehicle on the basis of detected information of the detection means for lane of travel, and assisting traveling of the vehicle on the lane on the basis of curvature of the road in the direction vehicle traveling in estimated by comparing the calculated curvatures.

SUMMARY OF THE INVENTION

In light of the foregoing, the present invention provides a lane keeping assist device for a vehicle, which includes a steering control means operated in accordance with an operation of a steering wheel by an operator for controlling a steering state in accordance with traveling state of a vehicle on a road, a detection means for lane of travel for detecting a lane mark indicating the lane of travel based on continuous images of the road captured by an image capturing means, a navigation system for detecting information of a road configuration including positional coordinates by a predetermined distance in the direction the vehicle traveling in, a state detection means for detecting a steering state and traveling state of the vehicle, a vehicle state amount calculation means for calculating a state amount of the vehicle in accordance with the steering state and the traveling state of the vehicle and detected result of the detection means for lane of travel, a first road curvature calculation means for calculating a first road curvature in the direction the vehicles traveling in on the basis of detection result of the state detection means and calculation result of the vehicle state amount calculation means, a second road curvature calculation means for calculating a second road curvature in the direction the vehicle traveling in on the basis of positional coordinates by a predetermined distance in the direction the vehicle traveling in detected by the navigation system, a road curvature estimation means for estimating road curvature in the direction the vehicle traveling in on the basis of calculation result of the first road curvature calculation means and calculation result of the second road curvature calculation means, and a target state amount setting means for setting a target state amount relative to the vehicle on the basis of the traveling state and the steering state of the vehicle detected by the state detection means and road curvature estimated by the road curvature estimation means. Travel of the vehicle in the lane of travel is assisted in accordance with comparison result between a target state amount set by the target state amount setting means and a state amount calculated by the vehicle state amount calculation means.

According to another aspect of the present invention, a vehicle lane keeping assist device includes a steering control means operated in accordance with an operation of a steering wheel by an operator for controlling a steering state in accordance with traveling state of a vehicle on a road, a detection means for lane of travel for detecting a lane mark indicating the lane of travel based on continuous images of the road captured by an image capturing means, and a navigation system for detecting information of a road configuration including positional coordinates by a predetermined distance in the direction the vehicle traveling in. Travel of the vehicle in the lane of travel is assisted by controlling the steering control means so that the vehicle travels in the lane of travel detected by the detection means for lane of travel. The vehicle lane keeping assist device further includes a road curvature calculation means for calculating road curvature in the direction the vehicle traveling in on the basis of positional coordinates by a predetermined distance in the direction the vehicle traveling in detected by the navigation system, and a cancellation means for canceling travel assist of the vehicle in the lane of travel when at least one of following states is applied: a maximum road curvature in the direction the vehicle traveling in is equal to or greater than a predetermined maximum curvature and a minimum Clothoid coefficient in the direction the vehicle traveling in is equal to or less than a predetermined minimum Clothoid coefficient under a condition that road curvature at a position of the own vehicle among the road curvature calculated by the road curvature calculation means is equal to or less than a predetermined straight reference curvature.

BRIEF DESCRIPTION OF THE DRAWINGS

The foregoing and additional features and characteristics of the present invention will become more apparent from the following detailed description considered with reference to the accompanying drawings, wherein:

FIG. 14 is a graph explaining a setting of a target coordinate according to a second embodiment of the present invention.

DETAILED DESCRIPTION

Embodiments of the present invention will be explained with reference to illustrations of drawing figures as follows.

Figure 1:
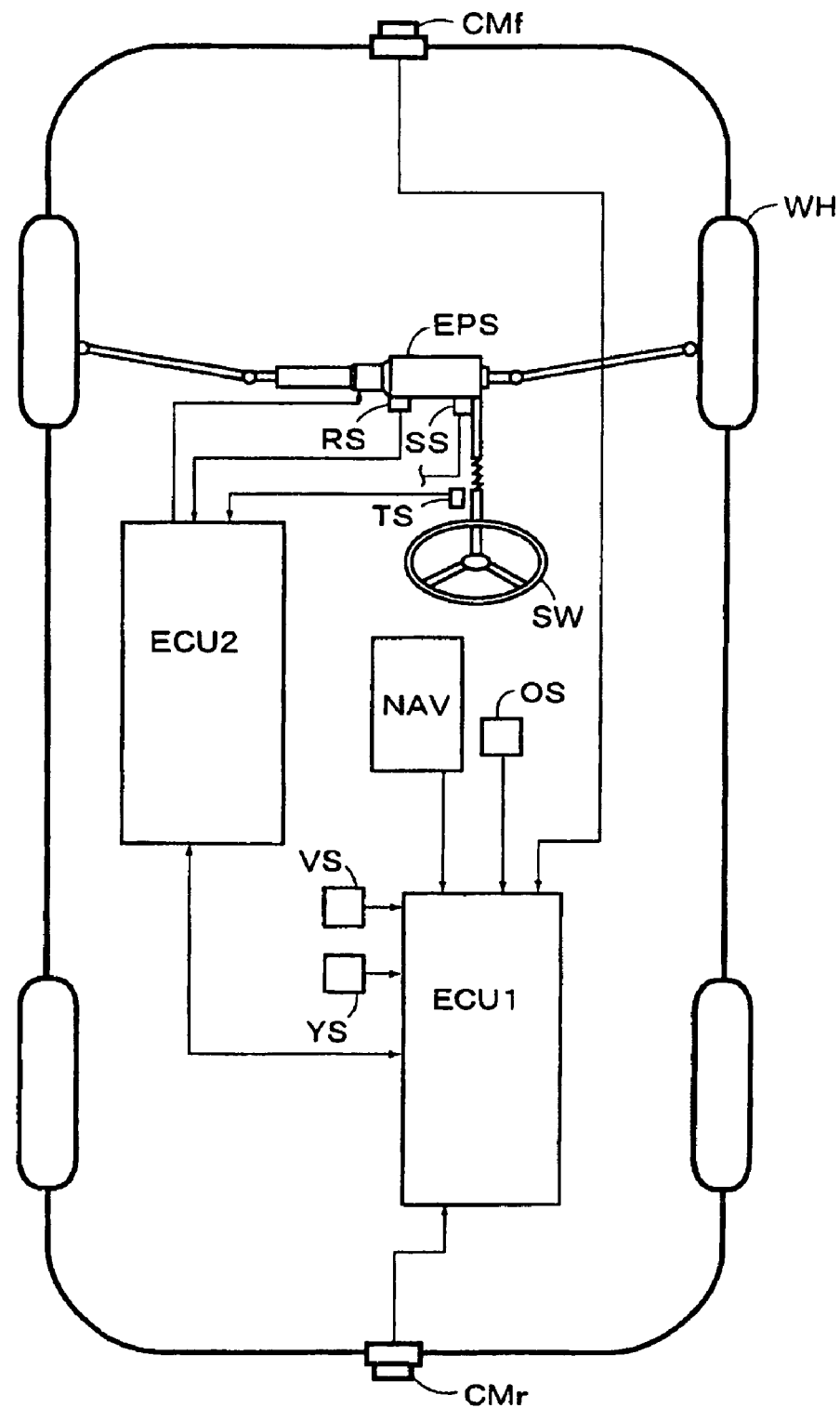
FIG. 1 is a view showing a construction of a lane keeping assist device for a vehicle according to a first embodiment of the present invention.

As shown in FIG. 1, a lane keeping assist device according to a first embodiment of the present invention includes a camera CMf provided at a front end of a vehicle for observing forward including a CCD camera serving as an image capturing means (i.e., top in FIG. 1) and a camera CMr provided at a rear end of the vehicle for observing backward of the vehicle, which also includes a CCD camera serving as the image capturing means. Providing one of the cameras CMf, CMr is sufficient to capture images. The lane keeping assist device includes an electric power steering system EPS serving as a steering control means. A known electric power steering system is applied as the electric power steering system EPS for detecting steering torque affecting a steering shaft by an operation of a steering wheel SW by a driver by means of a steering torque sensor TS, controlling an EPS motor MT (shown in FIG. 2) in accordance with the detected steering torque, steering front wheels (WH shown in FIG. 1 represents all wheels) via a reduction gear and a rack and pinion, and reducing steering wheel operational force by the driver.

As shown in FIG. 1, the lane keeping assist device includes an electronic control unit ECU 1 for picture processing and an electronic control unit ECU 2 for steering control. The electronic control unit ECU 1 for picture processing and the electronic control unit ECU 2 for steering control are connected via a communication bus. The cameras CMf, CMr are connected to the electronic control unit ECU 1, and image signals are inputted into the electronic control unit ECU 1. The electronic control unit ECU 1 is also connected to a steering angle sensor SS for detecting steering angle of front wheels WH, a vehicle speed sensor VS for detecting vehicle speed, and a yaw rate sensor YS for detecting yaw rate of the vehicle. Because the electronic control unit ECU 1 and the electronic control unit ECU 2 are configured to bilaterally send and receive signals each other, the steering angle sensor SS, the vehicle speed sensor VS, and the yaw rate sensor YS may be connected to the electronic control unit ECU 2. With the construction of the embodiment of the present invention, the vehicle speed sensor VS also serves as a replacement for a wheel speed sensor for detecting wheel speed of each wheel, and the vehicle speed may be estimated on the basis of the detected wheel speed. On the other hand, the electronic control unit ECU 2 is connected to the steering torque sensor TS and a rotation angle sensor RS for detecting rotation angle of the EPS motor at an input side, and is connected to the EPS motor at an output side.

Further, the electronic control unit ECU 1 (or the electronic control unit ECU 2) includes a navigation system NAV having a GPS and inertial navigation. The information of road configuration in the direction the vehicle is traveling in detected by the navigation system NAV is inputted into the electronic control unit ECU 1 (or the electronic control unit ECU 2). In this case, known devices can be applied as long as the information of the road configuration includes positional coordinates at a predetermined position in the direction the vehicle is traveling in, and the navigation system NAV is configured to produce the positional coordinates at the predetermined position in the direction the vehicle is traveling in. Thus, the explanation of the construction of the navigation system NAV will not be repeated.

Figure 2:
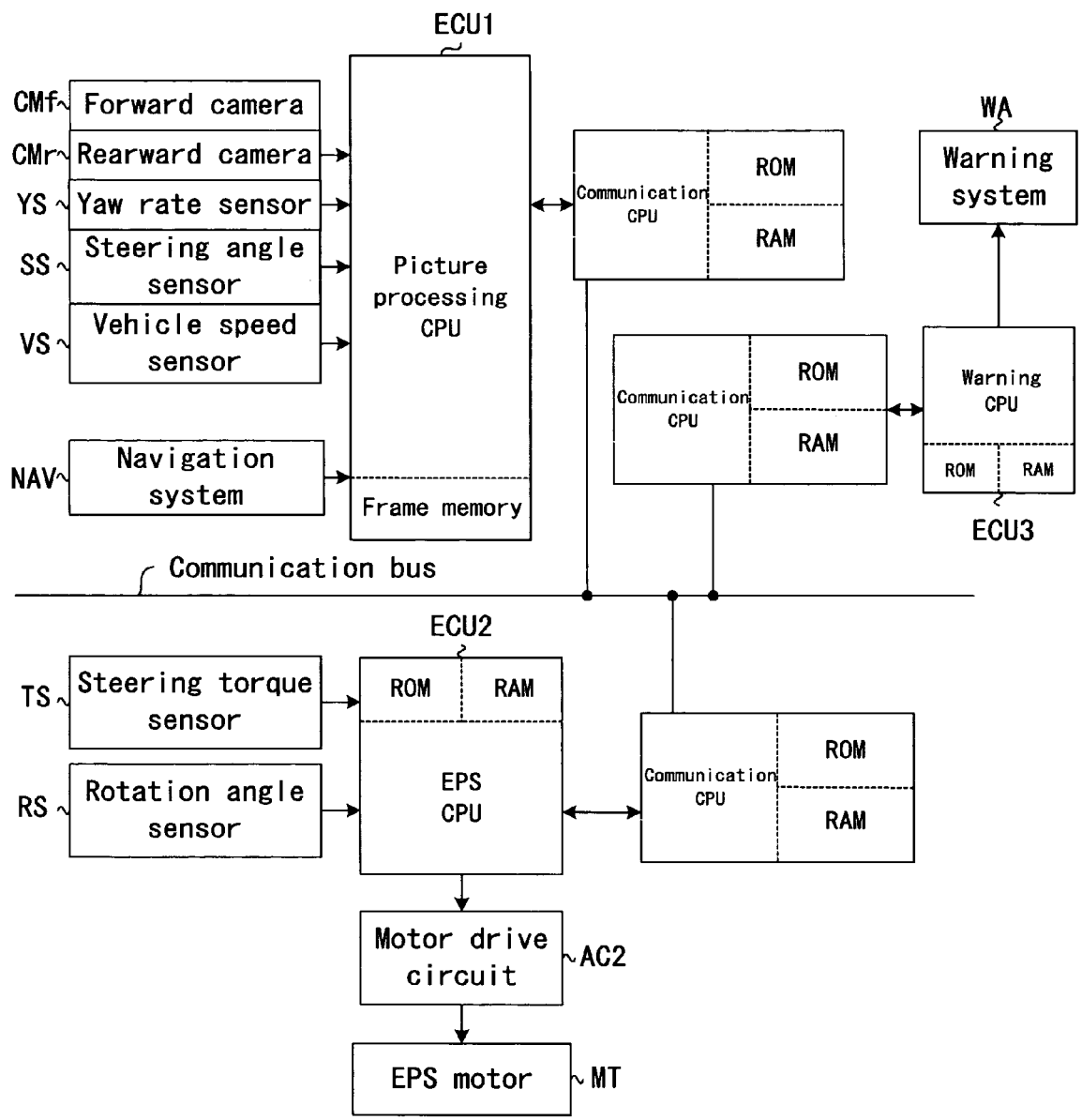
FIG. 2 is a block view showing a construction of the lane keeping assist device including a steering control means according to the first embodiment of the present invention.

As shown in FIG. 2, a system according to the embodiment of the present invention includes a picture processing system (i.e., shown at top in FIG. 2) and a steering control system (shown at bottom in FIG. 2) which are connected each other via a communication bus. The picture processing system according to the embodiment of the present invention includes the electronic control unit ECU 1 including a CPU for picture processing and frame memory, and the electronic control unit ECU 1 is connected to the camera CMf for observing forward and the camera CMr for observing backward, the yaw rate sensor YS, the steering angle sensor SS, the vehicle speed sensor VS, and the navigation system NAV. The steering control system according to the embodiment of the present invention includes the electronic control unit ECU 2 including a CPU for electric power steering control, ROM, and RAM, and the electronic control unit ECU 2 is connected to the steering torque sensor TS and the rotational angle sensor RS. Further, the electronic control unit ECU 2 is connected to the EPS motor MT via a motor drive circuit AC2, and is connected to a warning system WA for outputting warning messages and warning sounds via an electronic control unit ECU 3 for warning (shown in FIG. 2).

The electronic control units ECU 1–3 are connected to the communication bus via a communication unit including CPU, ROM, and RAM, and the information necessary for each control system can be sent from other control systems. Further, by connecting an active steering system, a brake control system, and a throttle control system, or the like, to the communication bus, the system information can be shared between each system. As shown in FIG. 1, electronic control unit ECU 1 (or the electronic control unit ECU 2) is connected to an operation switch OS, and the travel assist control is started by operating the operation switch by the driver.

Figure 3:
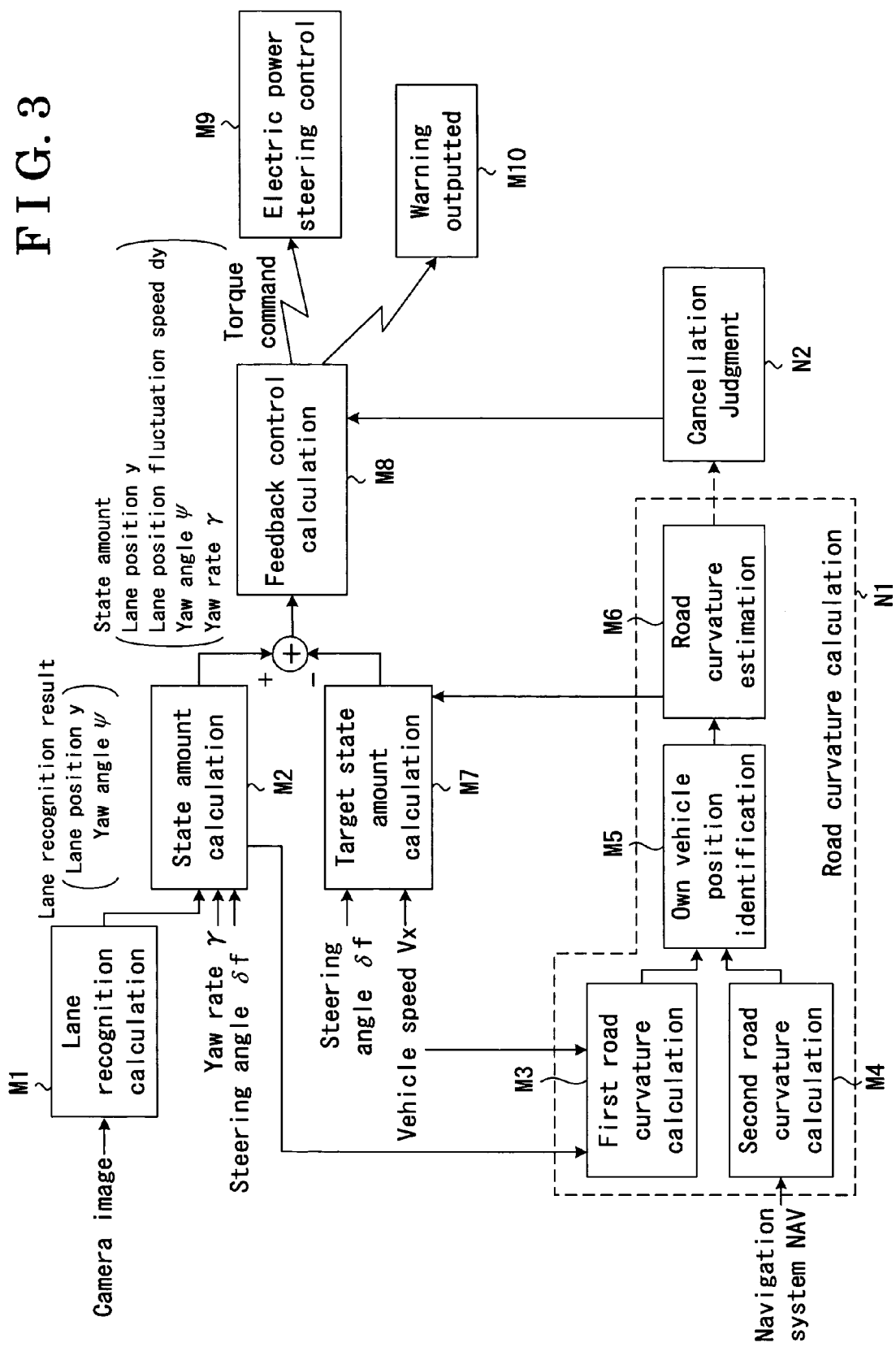
FIG. 3 is a block view showing a manner for control according to the first embodiment of the present invention.
Figure 6:
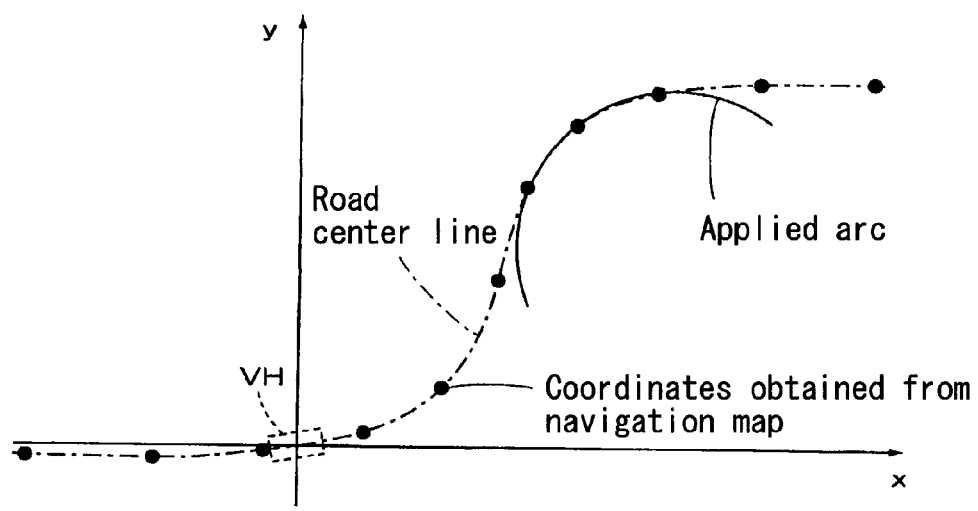
FIG. 6 is a graph explaining a navigation road curvature data row (i.e., a second road curvature data row) according to the first embodiment of the present invention.
Figure 7:
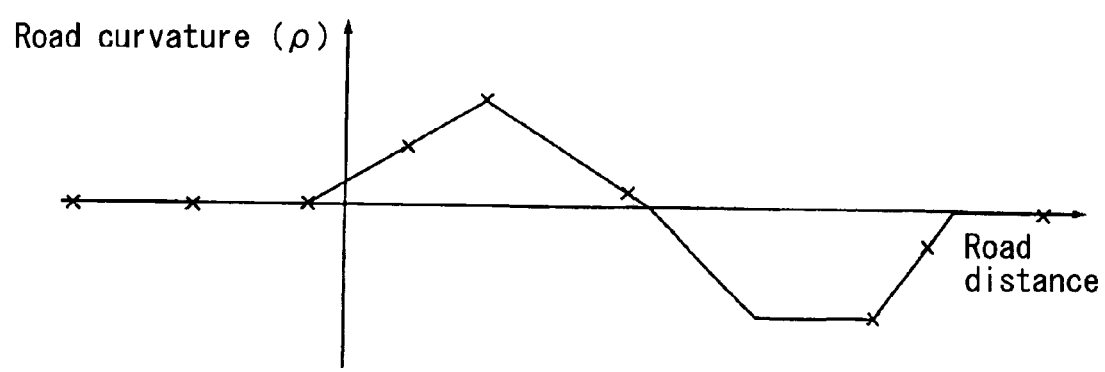
FIG. 7 is a graph showing data of accumulated calculation result of the second road curvature using a change of road curvature relative to a road distance according to the first embodiment of the present invention.

According to the lane keeping assist device according to the embodiment of the present invention, a lane travel assist control portion is constructed as shown in FIG. 3. Positional coordinates by a predetermined distance in the direction the vehicle traveling in (i.e. VH shown in FIG. 6) among the information of the road configuration detected by the navigation system NAV is inputted into a road curvature calculation portion N1, and road curvature (ρ) at a position distant from the own vehicle by a predetermined distance in the direction the vehicle VH traveling in (i.e., forward) is calculated. More particularly, as shown in FIG. 6, an arc is applied to plural road coordinates (positional coordinates shown with dots in FIG. 6) detected by the navigation system NAV, and the curvature of the arc is calculated. A method for applying arc on three points and a method for obtaining arc so that the error of mean square is minimized from coordinates equal to or more than four points (i.e., method of least squares) may be applied for applying arc on the positional coordinates of the road. Thus, the road curvature (ρ) relative to the predetermined position in the direction of the vehicle VH traveling in (forward) is accumulated as the information of the road configuration, and a map shown in FIG. 7 is formed. In FIG. 7, the road curvature (ρ) relative to the road distance is used.

Figure 11:
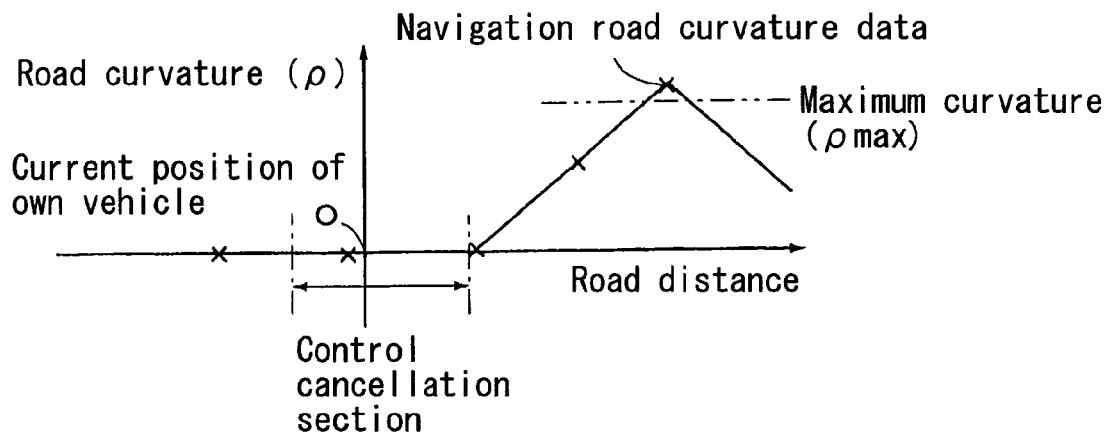
FIG. 11 is a graph showing relationship between the road distance and the road curvature including an example of a control canceling section according to the first embodiment of the present invention.

At a cancellation judging portion N2 shown in FIG. 3, the map shown in FIG. 7 is refereed to judge whether the position of the vehicle VH (i.e., the own vehicle) is at a state where equal to or less than a predetermined straight traveling reference curvature (i.e., whether the vehicle is traveling approximately straight). In case the vehicle VH is traveling at approximately straight traveling state, the road curvature (ρ) at a position distant from the own vehicle by a predetermined distance in the direction the vehicle VH traveling in (forward) is compared with a predetermined maximum curvature (ρ max). As a result, as shown in FIG. 11, when it is judged that the maximum road curvature is equal to or greater than a predetermined maximum curvature (ρ max, for example, ρ max=1/230) under a condition that the current position of the vehicle VH (i.e., own vehicle) is at a state equal to or less than the predetermined straight traveling reference curvature (i.e., approximately straight traveling state), for example, a signal for commanding a cancellation of the control is outputted to a feedback control calculation portion M4 (i.e., explained hereinafter), and the travel assist within the lane of travel of the vehicle is cancelled. Because the road curvature (ρ) is used in FIG. 11, a two dotted line indicating the maximum curvature (ρ max) is the maximum value. Thus, as shown in FIG. 11, because a predetermined distance range having a position of the own vehicle as the center is set as a control canceling section within a range at the approximately straight state, the travel assist is not canceled during a time that the vehicle travels at a curve, and the travel assist can be securely canceled before the vehicle entering the curve. Navigation curvature data shown with crosses in FIG. 11 correspond to the calculated result of the road curvature calculation portion N1, and a data row is formed by connecting the calculated results of the road curvature calculation portion N1 with a solid line (i.e., data row is formed likewise for FIG. 12 and FIG. 13 which are explained hereinafter).

A lane of travel is detected by conducting picture processing of the image information captured by the camera CMf or CMr in FIG. 1 at the electronic control unit ECU 1 (FIG. 2). The electronic control unit ECU 1 includes a lane recognition calculation portion M1 serving as lane detection means. A position y in a lateral direction (i.e., lane position) of the vehicle in the lane of travel and a yaw angle ψ relative to the lane of travel are calculated in the lane recognition calculation portion M1. The lane of travel can be detected by known method of the picture processing from the camera CMf or CMR.

On the basis of the calculation result by means of the lane recognition calculation portion M1 and the detection signal from the yaw rate sensor YS and the steering angle sensor SS, a current state amount X of the vehicle is estimated and calculated at a state amount calculation portion M2 serving as a vehicle state amount calculation means. The state amount X is estimated and calculated having a lane position y, a lane moving speed dy in a lateral direction (i.e., time differential value of the lane position y corresponding to the moving speed of the vehicle in the lateral direction within the lane of travel), a yaw angle ψ, and a yaw rate γ as factors. In other words, when a state amount of the vehicle is represented as X, a state amount output is represented as Y, and an input of a road model is represented as U, $X=[y, dy, \psi, \gamma]T$, $Y=[y, dy, \psi, \gamma]T$, $U=[\delta f, \rho]T$ are established. Here, δf corresponds to steering angle detected by the steering angle sensor SS, and ρ corresponds to the road curvature of the traveling road which is, for example, estimated and calculated on the basis of images captured by the camera CMf or CMr. When a state amount estimation value is represented as Xe, and observer gains is represented as L, a following state equation is established. Here, an equation of the state amount output Y is established as $Y=C \cdot Xe$.

$$dXe/dt = A \cdot Xe + B \cdot U + R1 \cdot L \cdot (X-Xe)$$

Model constants A, B, and C at the foregoing state equation are shown as follows.

A=[a11 a12, a13, a14; a21 a22, a23, a24; a31, a32, a33, a34; a41 a42 a43 a44]

B=[b11 b12; b21 b22; b31 b32; b41 b42]

C=[1 0 0 0; 0 1 0 0; 0 0 1 0; 0 0 0 1]

R1 is a factor indicating a lane detection state of an image recognition result, and for example, a state where the lane of travel is detected is indicated as 1 and a state where the lane of travel is not detected is indicated as 0. Accordingly, it is configured that the position of the vehicle in the lateral direction within the lane of travel is estimated only when a continuous line portion of the lane mark is detected, or the position of the vehicle in the lateral direction within the lane of travel can be reflected on the estimated result only when the continuous line portion of the lane mark is detected.

Figure 5:
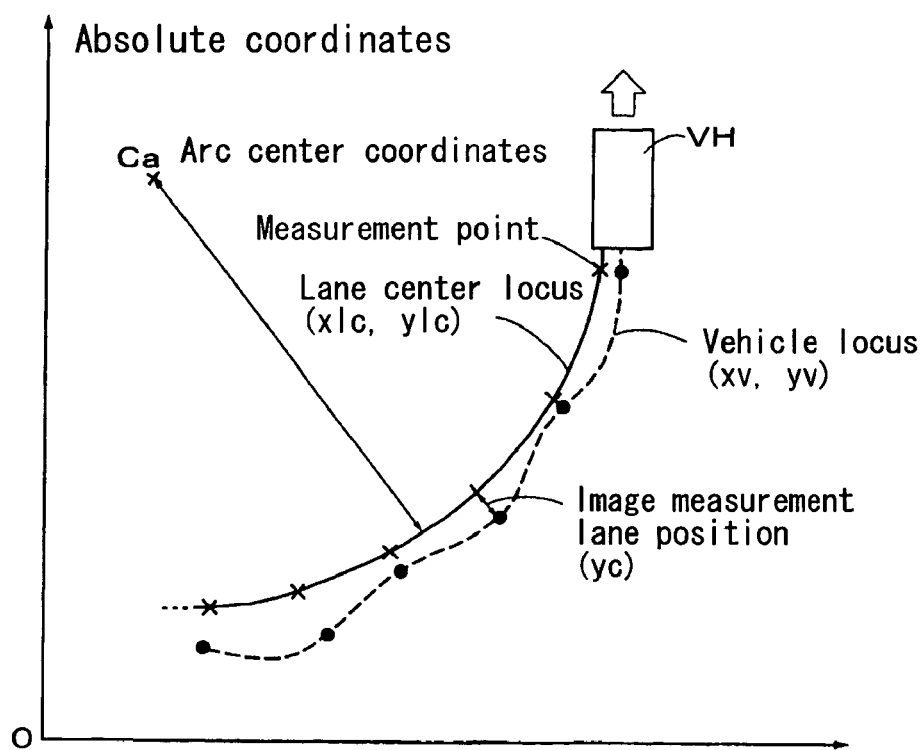
FIG. 5 is a graph explaining an own vehicle locus road curvature data row (i.e., a first road curvature data row) according to the first embodiment of the present invention.

On the other hand, a relative position index showing a relative position of the vehicle relative to the lane of travel is calculated at the state amount calculation portion M2, and a first road curvature is calculated at a first road curvature calculation portion M3 on the basis of the relative position index, the yaw rate detected by the yaw rate sensor YS, and the vehicle speed Vx detected by the vehicle speed sensor VS. FIG. 5 shows a traveling locus (dotted line) of the vehicle VH and a locus of the center of the lane of travel (i.e., solid line) on the absolute coordinates. Positional coordinates in the center of the lane are represented as (xlc, ylc), and positional coordinates of the vehicle are represented as (xv, yv). Ca in FIG. 5 indicates an arc center of the locus of the center of the lane of travel.

Algorism of the first road curvature calculation according to the embodiment of the present invention will be as follows. That is, a plane surface lane coordinates (i.e., the absolute coordinate) shown in FIG. 5 is generated on the basis of the lane position y of the vehicle obtained on the image in the foregoing manner, positional coordinates of the vehicle is calculated on the basis of the detected yaw rate γ and the vehicle speed Vx, positional coordinates of the center of the lane is calculated on the basis of the calculated result of the positional coordinates of the vehicle and the lane position y, and curvature is calculated by the method of least squares by accumulating the calculation results. More particularly, first, positional coordinates (xv, yv) of the vehicle is obtained as follows on the basis of the detected yaw rate γ and the vehicle speed Vx every control period.

$$xv = \iint Vx \cdot \cos(\psi+\beta) dt \, dt = \Sigma Vx \cdot \Delta t \cdot \cos(\psi+\beta)$$

$$yv = \iint Vx \cdot \sin(\psi+\beta) dt \, dt = \Sigma Vx \cdot \Delta t \cdot \sin(\psi+\beta)$$

The yaw angle ψ in the foregoing equation can be obtained as $\psi = \int \gamma dt$ on the basis of the yaw rate γ. A slip angle β can be obtained by the following equation.

$$\beta = [\{1 - (Mv/2L) \cdot Lf/(Lr \cdot Cr)\}/(1+K \cdot Vx^2)] \cdot (Lr/L) \delta f$$

Here, Mv represents vehicle mass, L represents a wheel base, Lf and Lr represent distances between center of gravity of the vehicle and the center of front wheel axle and between center of gravity of the vehicle and the center of rear wheel axle respectively (i.e., L=Lf+Lr), Cr represents cornering factor of rear wheels, K represents stability factor, Vx represents vehicle speed, and δf represents steering angle.

Next, positional coordinates of the center of the lane off-set from the positional coordinates of the vehicle is obtained every time obtaining the lane position y. Basically, positional coordinates is calculated to be vertical to the direction the vehicle traveling in and the yaw angle ψ assumes zero (0). In case the error is significant, the error is corrected by actually measured yaw angle. In other words, positional coordinates (xlc, ylc) of the center of the lane can be obtained in the following manner by adding the off-set amount in the vertical direction relative to the positional coordinates (xv, yv) of the vehicle at a time of measuring the lane position y (i.e., a lane position at the time of measurement is represented as yc).

$$xlc = xv + (-yc) \cdot \cos(\omega + 90 \text{ deg})$$

$$ylc = yv + (-yc) \cdot \sin(\psi + 90 \text{ deg})$$

Accordingly, by producing a portion of accumulated positional coordinates (xlc, ylc) of the center of the lane to obtain a parameter of a circle by method of least squares on a presumption that the locus of the center of the lane of travel is an arc, a radius of the circle corresponds to a radius of the road and the curvature is determined as the first road curvature (ρv (n)).

A positional coordinates by a predetermined distance in the direction of the vehicle VH traveling in (forward) among the information of the road configuration detected by the navigation system NAV is inputted to a second road curvature calculation portion M4 where a second road curvature at a position distant from the own vehicle by a predetermined distance in the direction the vehicle VH traveling in (forward) is calculated. More particularly, as shown inn FIG. 6, several arcs among plural road coordinates (i.e., positional coordinates shown with bots in FIG. 6) detected by the navigation system NAV are applied, and curvature of the arcs is calculated. A method for obtaining an arc connecting three points and a method for obtaining an arc from coordinates equal to or more than four points so that the error of mean square is reduced (i.e., method of least squares) can be applied in order to apply the arcs on the positional coordinates on the road. Thus, the second road curvature relative to the predetermined position in the direction the vehicle VH traveling in (forward) is accumulated as the information of the road configuration in the direction the vehicle traveling in, and a map shown in FIG. 7 is formed. The road curvature (ρ) is applied in FIG. 7.

Figure 8:
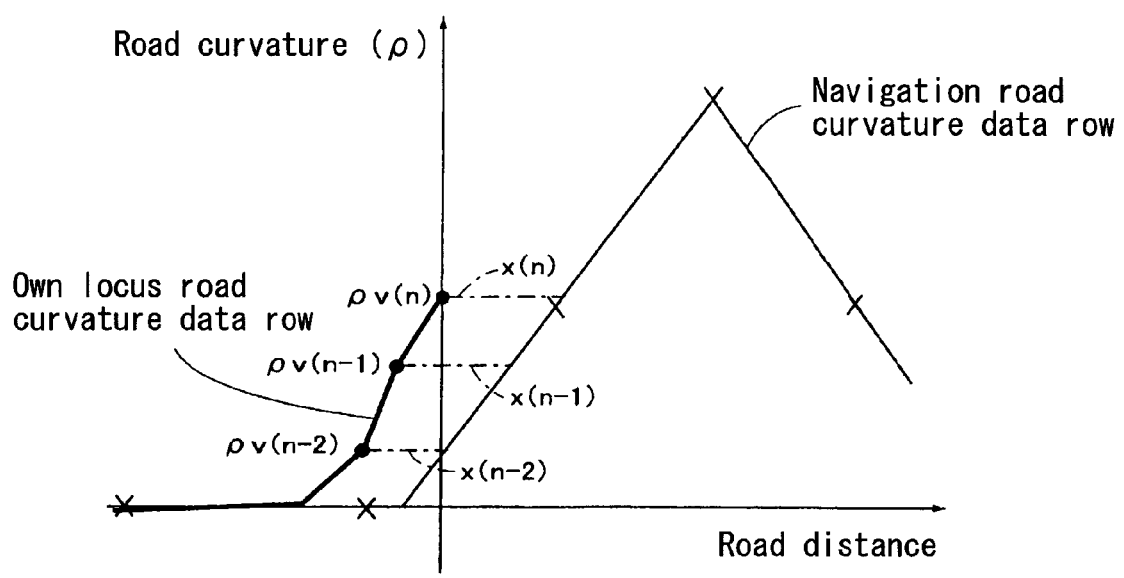
FIG. 8 is a graph showing relationship between the first road curvature data row and the second road curvature data row according to the first embodiment of the present invention.
Figure 9:
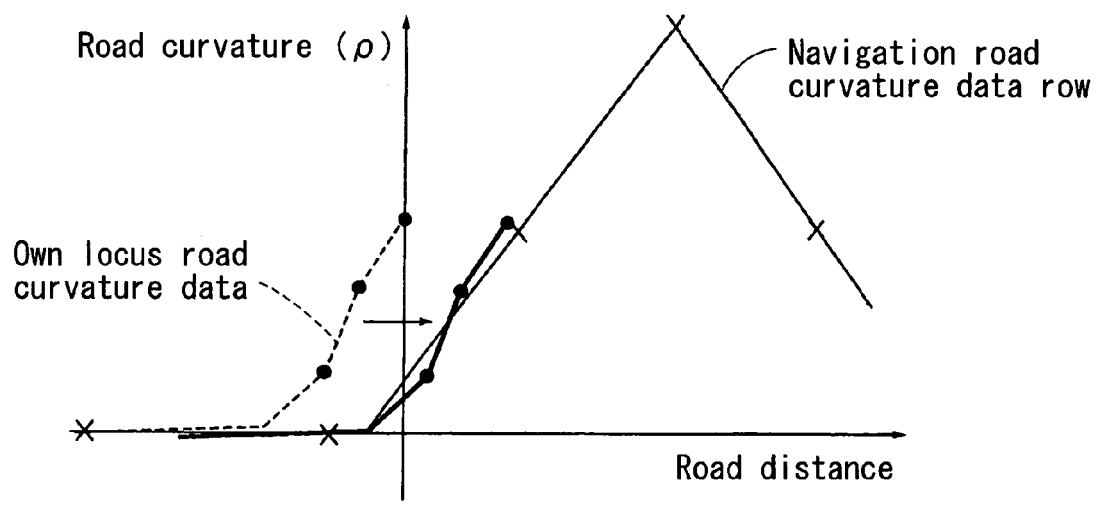
FIG. 9 is a graph showing a situation for estimating a point corresponding to the second road curvature data row by shifting the first road curvature data according to the first embodiment of the present invention.

Thereafter, as shown in FIG. 8, at an own vehicle position identification portion M5, a deviation (x(n), x(n−1), x(n−2), x(n), . . . , x(n−k)) of a road distance between an own vehicle locus road curvature data row (i.e., a first road curvature data row) (ρv(n), ρv(n−1), ρv(n−2), ρv(n), . . . , ρv(n−k)) and corresponding navigation road curvature data row (i.e., second road curvature data row) every measurement of the positional coordinates (i.e., own vehicle locus coordinates) can be obtained, and on average value (=(1/k)·Σx(n−i)), here, Σ is i=1~k) can be obtained. Accordingly, the deviation of the first road curvature relative to the second road curvature can be clearly shown, and a position of the vehicle VH relative to the second road curvature is specified. Thus, as shown in FIG. 9, by shifting the own locus road curvature data row shown with dotted line by the average value (=(1/k)·Σx(n−i)), a point corresponding to the navigation road curvature data row at that timing can be estimated. Accordingly, Clothoid coefficient (A) at that timing can be estimated at a road curvature estimation portion M6. Relationship between the road curvature (ρ) and Clothoid coefficient (A) is shown as ρ=L/A² (i.e., L shows traveling distance), and the estimation of the Clothoid coefficient means the estimation of the road curvature (ρ).

Figure 10:
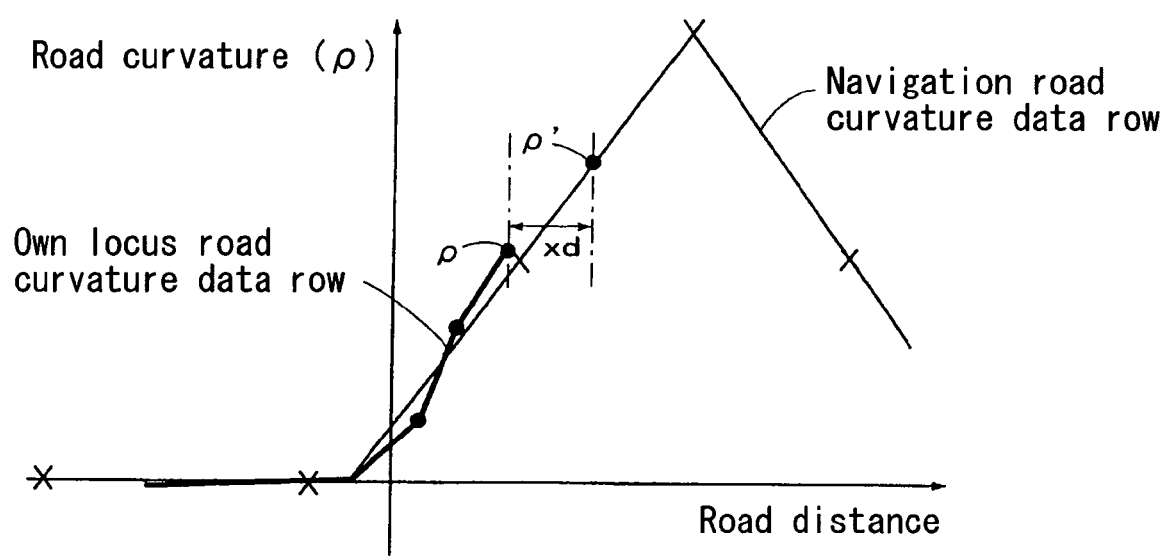
FIG. 10 is a graph showing a correction situation of the road curvature in case there is a delay for estimating the road curvature according to the first embodiment of the present invention.

In case there is, for example, a delay by xd at the road distance when estimating the road curvature (ρ) at the road curvature estimation portion M6, as shown in FIG. 10, the road curvature (ρ) may be replaced by a road curvature (ρ') by correcting the road curvature (ρ) by a curvature recognition delay distance (xd). For example, when the road on which the vehicle is traveling is formed along Clothoid, ρ' can be replaced by (ρ+xd/A²) (i.e., A is Clothoid coefficient). On the other hand, in case the road curvature can be reduced, ρ' is replaced by (ρ−xd/A²).

The road curvature (ρ) estimated in the foregoing manner is inputted into a target state amount calculation portion M7, and a target state amount is calculated at the target state amount calculation portion M7 on the basis of the road curvature (ρ) as follows. That is, the target state amount including following four factors is calculated at the target state calculation portion M7 on the basis of the road curvature (ρ) estimated at the road curvature estimation portion M6 in addition to the steering angle δf detected by the steering angel sensor SS and the vehicle speed Vx detected by the vehicle speed sensor VS.

First, a target lane position yt relative to a position in lateral direction of the vehicle in the lane of travel (i.e., lane position) is set as yt=0 having the center of the lane of travel (i.e. the center between boarders of the lanes) as a starting point. Thereafter, a target moving speed dyt in a lateral direction in a lane is set as dyt=0 so that the vehicle moves along the center of the lane of travel without rolling. A target yaw angle ψt is set as ψt=C·ρ. C is transformation constant from the road curvature (ρ) to the target yaw angle ψt. A target yaw rate γt is set as γt=Vx·ρ on the basis of the vehicle speed Vx and the road curvature (ρ).

Accordingly, a difference between the calculation result of the target state amount calculation portion M7 (i.e., target state amount) and the calculation result of the state amount calculation portion M2 (i.e., the current state amount) is calculated, and a torque command value is calculated at a feedback control calculation portion M8 on the basis of the difference obtained above. In other words, at the feedback control calculation portion M8, error feedback terms of the lateral displacement is formed by weighing each difference between estimated value (i.e., adding e) and target value (i.e., adding t) of four factors indicating the foregoing target state amount by control gains K1–K4, and further, a steering angle feed forward terms δff(ρ) corresponding to the road curvature (ρ) is added to total of those, and is set as a target rotational angle (i.e. target steering angle) δswt.

$$\delta swt = K1 \cdot (yt-ye) + K2 \cdot (dty-dye) + K3 \cdot (\psi t-\psi e) + K4 \cdot (\gamma t-\gamma e) + \delta ff(\rho)$$

δff(ρ) is calculated as a steering angle theoretical value at the road curvature (ρ) derived from two-wheel model as follows. Here, Vx represents vehicle speed, L represents wheel base, and K represents stability factor.

$$\delta ff(\rho) = Vx \cdot \rho / Vx \cdot L(1 + K \cdot Vx^2)$$

An addition steering torque command value Tadd is calculated in accordance with a difference between the target rotation angle (i.e., target steering angle) δswt and an actual rotational angle (i.e., actual steering angle) δsw detected by the rotational angle sensor RS and addition steering torque feed forward terms Tff(ρ) as follows. Here, K5 is a control gain.

$$Tadd = K5 \cdot (\delta swt - \delta sw) + Tff(\rho)$$

Figure 4:
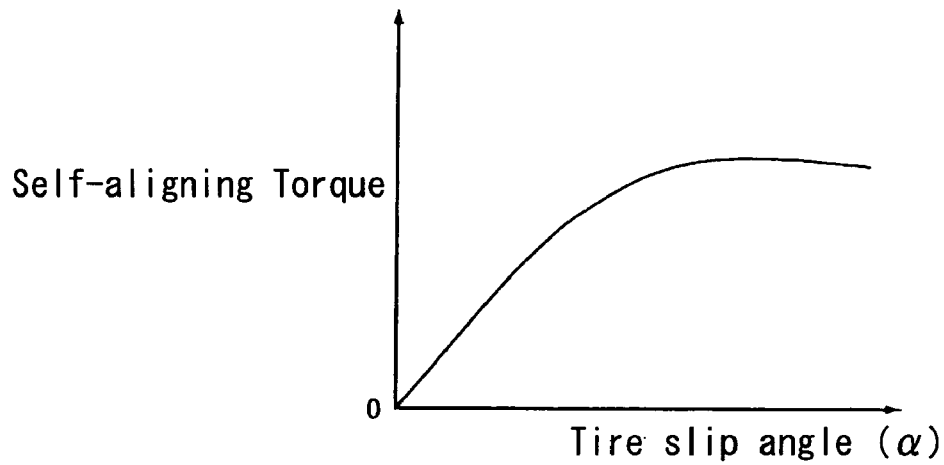
FIG. 4 is a graph showing an example of characteristics of self-aligning torque relative to a slip angle of a tire according to the first embodiment of the present invention.

The addition steering torque feed forward terms Tff(ρ) is calculated as follows.

$$Tff(\rho) = fatff(\beta ff(\rho) + \delta ff(\rho))$$

fatff(α) in the foregoing equation is a function indicating an self-aligning torque relative to a tire slip angle (α), and for example, is shown in FIG. 4. βff(ρ) is a normal vehicle slip angle at the road curvature (ρ), and is obtained as follows. The normal vehicle slip angle corresponds to a vehicle slip angle when a vehicle travels on a road with a constant road curvature at a constant vehicle speed.

$$\beta ff(\rho) = [\{1 - (Mv/2L) \cdot (Lf/(Lr \cdot Cr)) \cdot Vx^2\} / (1 + K \cdot Vx^2)] \cdot (Lr/L) \cdot \delta ff(\rho)$$

Here, Mv represents vehicle mass, L represents wheel base, Lf represents a distance from the center of the gravity of the vehicle to the center of the front wheel axle, Lr represents a distance from the center of the gravity of the vehicle to the center of the rear wheels axle, Cr represents a cornering factor of rear wheels, Vx represents vehicle speed, and K is stability factor.

The addition steering torque command value Tadd calculated in the foregoing manner is sent to the electronic control unit ECU2 (FIG. 2) for the steering control, the torque command value Tadd is added to a normal power steering control amount at the electric power steering control portion M9 (FIG. 3) to control the electric power steering system EPS, and a correction steering according to the present invention is conducted. Further, as necessity arises, the torque command value Tadd is supplied to a warming output portion M10, and a warning sound indicating possibilities of deviation of the vehicle from the lane of travel is outputted in accordance with a position of the vehicle from the center of the lane of travel, in other words, in accordance with the degree of the torque command value Tadd to draw attentions of a driver. The warning may be outputted in accordance with the estimated result of the position of the vehicle in the lateral direction in the lane of travel (i.e., calculation result at the state amount calculation portion M2) without using the torque command value Tadd.

Figure 12:
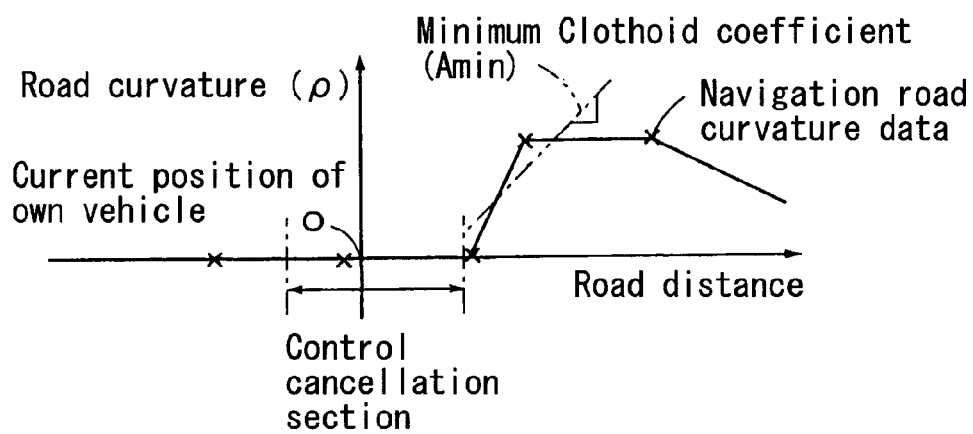
FIG. 12 is a graph showing a relationship between the road distance and the road curvature including another example of a control canceling section according to the first embodiment of the present invention.

At the cancellation judging portion (cancellation judgment) N2 shown in FIG. 3, the cancellation of the travel assist of the vehicle may be judged as shown in FIG. 12. That is, rate of change of the road curvature (ρ) in accordance with the road distance from the current position of the own vehicle is compared to a predetermined minimum Clothoid coefficient (Amin; here, shown with gradients as indicated with two dotted line in FIG. 12). When steep Clothoid coefficient is shown in FIG. 12, it is judged that the road curvature (ρ) is equal to or less than a predetermined minimum Clothoid coefficient (Amin), and the travel assist of the vehicle is cancelled. Here, relationship between the road curvature (ρ) and the Clothoid coefficient (A) is indicated as ρ=L/A² (i.e., L indicates a length of curve), and Amin=180 is set, for example. Further, the both judgment shown in FIGS. 11–12 may be used at the cancellation judging portion N2.

Figure 13:
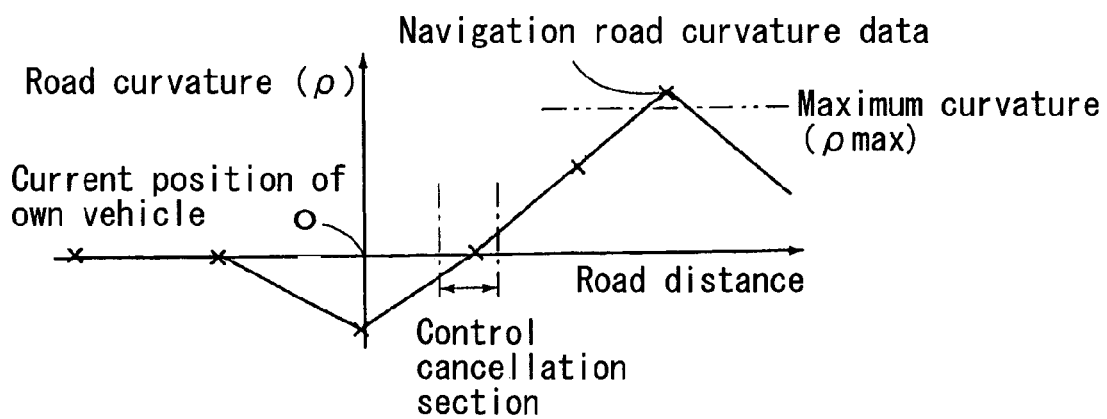
FIG. 13 is a graph showing a relationship between the road distance and the road curvature including further example of a control canceling section according to the first embodiment of the present invention.

With a road having navigation curvature data as shown in FIG. 13 where curves continue, because the current position O of the own vehicle is in the middle of a curve, a predetermined distance range at a state where the road curvature of at a position of own vehicle is equal to or less than a predetermined straight reference curvature (i.e., approximately straight) before entering a next curve (i.e., current forward direction of the vehicle) is set as a control cancellation section (shown in FIG. 13).

A second embodiment of the present invention will be explained with reference to FIG. 14. Using positional coordinates at a predetermined position in the direction of a vehicle VH (shown in FIG. 14) traveling in among the information of the road configuration detected by the navigation system NAV, the positional coordinates may be inputted into the electronic control unit ECU 1. More particularly, as shown in FIG. 14, a road curvature (ρ) in the vicinity of the position of the own vehicle is estimated by the method of least squares from several points among the plural road coordinates (i.e., positional coordinates shown with dots in FIG. 14) detected by the navigations system NAV, and x-y coordinates having an axis in parallel with tangents shown with two dotted line in FIG. 14 as x-axis is set. X coordinate value (xlt) of target coordinate point (a cross shown in FIG. 14) in the direction of the vehicle VH traveling in is set on the basis of the vehicle speed Vx of the vehicle VH, and y coordinate value (ylt) is calculated on the basis of the x coordinate value (xlt) as follows. Here, R is obtained as R=1/ρ.

$$ylt = ((yt-ye) + R \cdot (1 - \cos(\sin^{-1}(xlt/R)))$$

Accordingly, the target steering angle δwt is set in accordance with the lateral displacement (ylt−xlt·tan(ψ+Vx·γ)) at the target coordinates in the direction the vehicle traveling in as follows. Here, K6 is a control gain.

$$\delta swt = K6 \cdot (ylt - xlt \cdot \tan(\psi + Vx \cdot \gamma))$$

Thereafter, likewise the first embodiment of the present invention, addition steering torque command value Tadd is calculated indicated below, and feedback in accordance with displacement of the vehicle lateral direction is conducted, and the same transaction with the first embodiment of the present invention is applied. Here, K7 is a control gain.

$$Tadd = K7 \cdot (\delta swt - \delta sw)$$

According to the embodiments of the present invention, because the road curvature in the direction the vehicle traveling in can be accurately estimated on the basis of the first road curvature in the direction the vehicle traveling in calculated based on the detection result of the state detection means and the calculation result by the vehicle state amount calculation means, and on the basis of the second road curvature in the direction the vehicle traveling in calculated on the basis of the positional coordinates by the predetermined distance in the direction the vehicle traveling in detected by the navigation system, appropriate lane travel assist can be achieved.

According to the embodiment of the present invention, the road curvature can be estimated easily and appropriately by means of Clothoid information of the traveling road.

According to the embodiment of the present invention, because the target state amount relative to the vehicle is set on the basis of the traveling state and the steering state of the vehicle detected by the state detection means and the road curvature estimated by the road curvature estimation means, the lane travel assist of the vehicle can be conducted appropriately by using and applying the detection information of the navigation system to the curved lane mark without heavily relaying on precision of the image capturing means. Further, not only the forward camera but also the rearward camera can be applied, and further, low-price camera can be used.

According to the embodiment of the present invention, the lane travel assist of the vehicle can be smoothly conducted on the basis of the detection information of the navigation system by means of the steering correcting means.

According to the embodiment of the present invention, the travel assist of the vehicle in the lane of travel is cancelled at least one of the following conditions is applied: under a condition that the maximum road curvature in the direction the vehicle traveling in is equal to or greater than a predetermined maximum curvature, and under a condition that the minimum Clothoid coefficient in the direction the vehicle traveling in is equal to or less than a predetermined minimum Clothoid coefficient. Thus, the lane travel assist of the vehicle is not cancelled when the vehicle travels at a curve, and the lane travel assist can be securely canceled before the vehicle entering the curve.

According to the embodiment of the present invention, the target state amount relative to the vehicle is set on the basis of the steering state and the traveling state of the vehicle detected by the state detection means and on the basis of the road curvature calculated by means of the road curvature calculation means. Thus, the lane travel assist of the vehicle can be appropriately conducted by using the detected information of the navigation system and applying the detected information to the curved lane mark without heavily relying on the precision of the image capturing means. Further, not only the forward camera, but also the rearward camera can be applied, and conventional low-price cameras can be applied.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lane keeping assist device for a vehicle comprising:
   a steering control means operated in accordance with an operation of a steering wheel by an operator for controlling a steering state in accordance with traveling state of the vehicle on a road;
   a detection means for lane of travel for detecting a lane mark indicating the lane of travel based on continuous images of the road captured by an image capturing means;
   a navigation system for detecting information of a road configuration including positional coordinates by a predetermined distance in the direction the vehicle traveling in;
   a state detection means for detecting the steering state and the traveling state of the vehicle;
   a vehicle state amount calculation means for calculating a state amount of the vehicle in accordance with the steering state and the traveling state of the vehicle and detected result of the detection means for lane of travel;
   a first road curvature calculation means for calculating a first road curvature in the direction the vehicle traveling in on the basis of detection result of the state detection means and calculation result of the vehicle state amount calculation means;
   a second road curvature calculation means for calculating a second road curvature in the direction the vehicle traveling in on the basis of the positional coordinates by the predetermined distance in the direction the vehicle traveling in detected by the navigation system;
   a road curvature estimation means for estimating road curvature in the direction the vehicle traveling in on the basis of calculation result of the first road curvature calculation means and calculation result of the second road curvature calculation means; and
   a target state amount setting means for setting a target state amount relative to the vehicle on the basis of the traveling state and the steering state of the vehicle detected by the state detection means and the road curvature estimated by the road curvature estimation means;
   wherein
   travel of the vehicle in the lane of travel is assisted in accordance with comparison result between the target state amount set by the target state amount setting means and the state amount calculated by the vehicle state amount calculation means.

2. The lane keeping assist device according to claim 1, wherein the road curvature estimation means estimates the road curvature using Clothoid information of the road where the vehicle is traveling.

3. The lane keeping assist device according to claim 1, wherein
   the state detection means detects the steering state and the traveling state of the vehicle including yaw rate and vehicle speed of the vehicle;
   the vehicle state amount calculation means calculates the state amount including a relative position index indicating a relative position of the vehicle relative to the lane of travel in accordance with the steering state and the traveling state of the vehicle and detection result of the lane detection means;
   and the first road curvature calculation means calculates the first road curvature on the basis of the yaw rate and the vehicle speed detected by the state detection means and the relative position index of the vehicle calculated by the vehicle state amount calculation means.

4. The lane keeping assist device according to claim 1, further comprising: a steering correcting means for correcting steering control by the steering control means on the basis of an addition of a feedback control amount in accordance with a difference between the target state amount set by the target state amount setting means and the state amount calculated by the vehicle state amount calculation means and a feed forward control amount in accordance with the road curvature estimated by the road curvature estimation means.

5. A vehicle lane keeping assist device comprising:
- a steering control means operated in accordance with an operation of a steering wheel by an operator for controlling a steering state in accordance with traveling state of a vehicle on a road;
- a detection means for lane of travel for detecting a lane mark indicating the lane of travel based on continuous images of the road captured by an image capturing means;
- a navigation system for detecting information of a road configuration including positional coordinates by a predetermined distance in the direction the vehicle traveling in; wherein travel of the vehicle in the lane of travel is assisted by controlling the steering control means so that the vehicle travels in the lane of travel detected by the detection means for lane of travel;
- a road curvature calculation means for calculating road curvature in the direction the vehicle traveling in on the basis of the positional coordinates by the predetermined distance in the direction the vehicle traveling in detected by the navigation system; and
- a cancellation means for canceling travel assist of the vehicle in the lane of travel when at least one of following states is applied: a maximum road curvature in the direction the vehicle traveling in is equal to or greater than a predetermined maximum curvature and a minimum Clothoid coefficient in the direction the vehicle traveling in is equal to or less than a predetermined minimum Clathoid coefficient under a condition that road curvature at a position of the own vehicle among the road curvature calculated by the road curvature calculation means is equal to or less than a predetermined straight reference curvature.

6. The vehicle lane keeping assist device according to claim 5, further comprising:
- a state detection means for detecting a steering state and traveling state of the vehicle including yaw rate and vehicle speed of the vehicle;
- a vehicle state amount calculation means for calculating a state amount including a relative position index indicating a relative position of the vehicle relative to the lane of travel; and
- a target state amount setting means for setting a target state amount relative to the vehicle on the basis of the steering state and the traveling state of the vehicle detected by the state detection means and the road curvature calculated by the road curvature calculation means;
- wherein travel of the vehicle in the lane of travel is assisted in accordance with comparison result between the target state amount set by the target state amount setting means and the state amount calculated by the vehicle state amount calculation means.

* * * * *